US011137116B2

(12) United States Patent
Winand et al.

(10) Patent No.: US 11,137,116 B2
(45) Date of Patent: Oct. 5, 2021

(54) DEWAR VESSEL STORAGE APPARATUS

(71) Applicant: Intelligent Energy Limited, Loughborough (GB)

(72) Inventors: Henri Winand, Loughborough (GB); Anand Chellappa, Loughborough (GB); Paul Leonard Adcock, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 631 days.

(21) Appl. No.: 15/756,520

(22) PCT Filed: Aug. 25, 2016

(86) PCT No.: PCT/GB2016/052645
§ 371 (c)(1),
(2) Date: Feb. 28, 2018

(87) PCT Pub. No.: WO2017/037429
PCT Pub. Date: Mar. 9, 2017

(65) Prior Publication Data
US 2020/0224825 A1    Jul. 16, 2020

(30) Foreign Application Priority Data

Aug. 28, 2015  (GB) ..................................... 1515344
Sep. 22, 2015  (GB) ..................................... 1516763

(51) Int. Cl.
*F17C 13/08*        (2006.01)
*F17C 1/12*         (2006.01)
*F17C 13/00*        (2006.01)

(52) U.S. Cl.
CPC .............. *F17C 13/086* (2013.01); *F17C 1/12* (2013.01); *F17C 13/001* (2013.01);
(Continued)

(58) Field of Classification Search
CPC .... F17C 13/086; F17C 13/084; F17C 13/001; F17C 3/08; F17C 2270/01;
(Continued)

(56) References Cited

U.S. PATENT DOCUMENTS 2,075,408 A    3/1937  Grant
3,319,433 A *  5/1967  Pauliukonis .............. F17C 3/08
                                                       62/45.1
(Continued)

FOREIGN PATENT DOCUMENTS

WO    WO 2007/072470 A1    6/2007

OTHER PUBLICATIONS

International Patent Application No. PCT/GB2016/052645; Written Opinion and the Search Report; dated Mar. 24, 2017; 16 pages.
(Continued)

*Primary Examiner* — Brian M King
(74) *Attorney, Agent, or Firm* — Bakerhostetler

(57) ABSTRACT

A dewar vessel storage apparatus configured to hold at least two dewar vessels containing liquefied gas or cryo-compressed gas, comprising; a box having an outer, thermally insulating, wall; the box comprising a plurality of insulating cavities, each cavity configured to receive a single dewar vessel and is thermally insulated from each other cavity; a thermally insulating closure arrangement configured to close an open end of each cavity; a ventilation assembly comprising at least one conduit within the box configured to provide for venting of gas released from the dewar vessels when stored in the respective cavities of the box, the ventilation assembly configured to provide a gas outlet flow path from each cavity.

16 Claims, 3 Drawing Sheets

(52) U.S. Cl.
CPC .............. *F17C 2201/0109* (2013.01);
*F17C 2201/056* (2013.01); *F17C 2203/032*
(2013.01); *F17C 2203/0325* (2013.01); *F17C 2203/0329* (2013.01); *F17C 2203/0366*
(2013.01); *F17C 2203/0391* (2013.01); *F17C 2205/0111* (2013.01); *F17C 2205/0142*
(2013.01); *F17C 2205/0146* (2013.01); *F17C 2205/0176* (2013.01); *F17C 2205/0332*
(2013.01); *F17C 2205/058* (2013.01); *F17C 2221/012* (2013.01); *F17C 2223/0161*
(2013.01); *F17C 2227/0339* (2013.01); *F17C 2227/0355* (2013.01); *F17C 2250/034*
(2013.01); *F17C 2265/031* (2013.01); *F17C 2270/0189* (2013.01); *F17C 2270/0509*
(2013.01)

(58) Field of Classification Search
CPC ...... F17C 2270/0509; F17C 2201/0166; F17C 2203/032; F17C 2203/0325; F17C 2205/013; F17C 2205/0134; F17C 2205/0142

See application file for complete search history.

(56) References Cited

U.S. PATENT DOCUMENTS

| | | | |
|---|---|---|---|
| 2007/0084516 A1* | 4/2007 | Rose | F17C 13/084 138/30 |
| 2009/0283351 A1* | 11/2009 | Cannet | F17C 7/00 180/302 |
| 2015/0014186 A1* | 1/2015 | Wang | F17C 1/02 206/0.6 |

OTHER PUBLICATIONS

International Patent Application No. PCT/GB2016/052645; Int'l Preliminary Report on Patentability; dated Mar. 15, 2018; 13 pages.

* cited by examiner

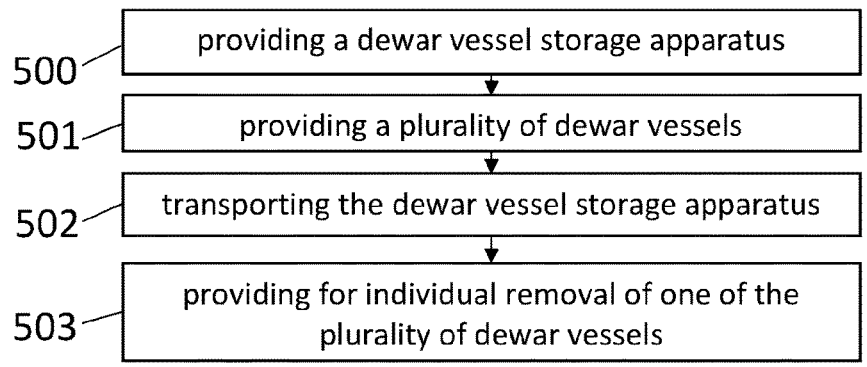
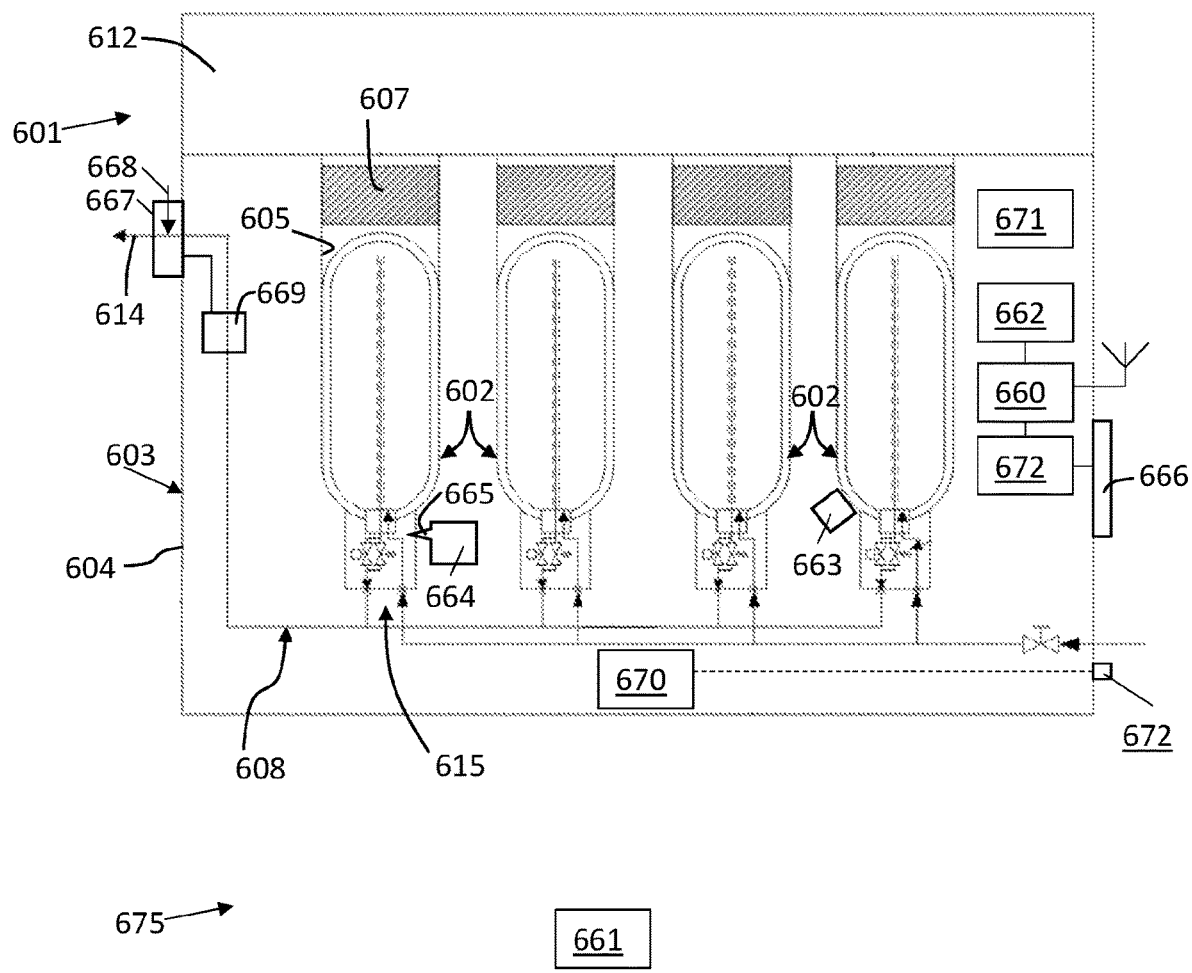

DEWAR VESSEL STORAGE APPARATUS

This disclosure relates to a dewar vessel storage apparatus and, in particular, a cryogenic gas storage apparatus. In particular, it provides a dewar vessel storage apparatus for storing compressed or liquefied natural gas, helium, nitrogen, hydrogen or other cryogenic liquids or cryo-compressed gasses or cryogenic liquid or slush. The invention also relates to a method of providing a liquefied or cryo-compressed gas or slush to a point of use.

According to a first aspect of the invention we provide a dewar vessel storage apparatus configured to hold at least two dewar vessels containing compressed, liquefied gas or cryo-compressed gas, comprising;
 a box having an outer, thermally insulating, wall;
 the box comprising a plurality of insulating cavities, each cavity configured to receive a single dewar vessel and is thermally insulated from each other cavity;
 each cavity including a separately removable thermally insulating bung configured to close an open end of its cavity;
 a ventilation assembly comprising at least one conduit within the box configured to provide for venting of gas released from the dewar vessels when stored in the respective cavities of the box, the ventilation assembly configured to provide a gas outlet flow path from each cavity.

This is advantageous as the apparatus provided a cryogenically insulated storage box for holding at least two dewar vessels for transportation or storage. The ventilation system that extends at least in part in the box, to connect to the cavities, advantageously provides for venting of boil-off gas from the dewar vessels. The bungs prevent disturbing the insulation around another dewar vessel when one is removed.

Optionally, the outer, thermally insulating, wall and/or insulation between each cavity and/or bung comprises at least one of;
 a vacuum insulated panel utilizing a multilayer insulation blanket in the vacuum gap;
 a vacuum jacket or panel with no multilayer insulation blanket in the vacuum gap;
 a wall utilizing spray on foam insulation; and
 a wall incorporating aerogel insulation.

Optionally, each cavity and its associated bung is configured complimentary to the shape of the dewar vessel it is configured to receive such that there is substantially no air space when the dewar vessel is received in the cavity and the bung is in place. The bungs are advantageous as they avoid the need to expose other dewar vessels to the ambient environment when removing one of the dewar vessels. Further, providing a tight fitting cavity and bung reduces the chance for air to freeze around the dewar vessel. It will be appreciated that manufacturing tolerances and surface finishes may allow for a very small quantity of air to be present around the dewar vessel. In other examples, the apparatus may be configured to provide for introduction of a fluid other than air into the space around a dewar vessel when in place in the cavity with the bung closing the open end. The fluid may have a freezing/condensing point lower than a predetermined temperature expected to be experienced within the cavity. Thus, the cavity and/or bung may have means to introduce said fluid. In other examples, the bung provides a hermetic seal and the cavity and/or bung includes means to introduce a vacuum within the bunged cavity around the dewar vessel.

Optionally, the outer walls of the box may have a thermal performance so as to achieve a thermal input from the surroundings of less than 100 W (or less than 10 W), such as when containing a cryogenic dewar vessel (which may contain fluid at less than 100K, 80K, 60K, 40K, 20K, 10K or 5K). It will be appreciated that the thermal performance of the apparatus is important if it is to store the dewar vessels for an extended period of time.

Optionally, the box includes an aperture configured to provide access to the cavities, said aperture closed by a removable thermally insulating lid. A combination of a lid and bungs is particularly advantageous to provide the required thermal performance as well as avoiding disturbing other dewar vessels when removing a dewar vessel. Optionally, the lid comprises at least one of;
 a vacuum insulated panel utilizing a multilayer insulation blanket in the vacuum gap;
 a vacuum jacket or panel with no multilayer insulation blanket in the vacuum gap;
 a wall utilizing spray on foam insulation; and
 a wall incorporating aerogel insulation.

Optionally, the ventilation assembly includes a releasable connector configured to releasably couple the outlet flow path of one of the cavities to a pressure relief valve of a dewar vessel inserted into said one of the cavities for receiving boiled-off fluid from the dewar vessel. In other examples, the ventilation system receives boiled-off fluid from the cavity. The cavities may be sealed.

Optionally, the releasable connector is arranged at a base of the cavity such that a connection is made between the dewar vessel and the ventilation assembly when the dewar vessel is substantially completely inserted into said cavity.

Optionally, the ventilation assembly comprises a manifold configured to connect to each cavity and provide a common ventilation flow path, the manifold providing the outlet flow path from each cavity. In other examples, the ventilation assembly provides for individual vents for each cavity.

Optionally, the ventilation assembly is configured to;
 connect the gas outlet flow path from at least one of the cavities to atmosphere;
 connect the gas outlet flow path from at least one of the cavities to burner or catalyser for consuming the vented gas;
 connect the gas outlet flow path from at least one of the cavities to an electrochemical fuel cell, the fuel cell configured to use gas vented from the one or more dewar vessels to generate electricity; or
 connect the gas outlet flow path from at least one of the cavities to a gas store; or provide a combination of the above.

Optionally, the ventilation assembly includes a controllable valve for controlling the receipt of gas into the gas outlet flow path of at least one or more or all of the cavities. In other examples, the controllable valve is provided in the dewar vessel. In another example, a control element, such as an electromagnetic actuator, is provided in the box for controlling a controllable valve, such as a solenoid valve, in the dewar vessel. Power required to actuate these control elements may be provided by a battery or by a fuel cell that consumes vented hydrogen or by a combination of one or more power sources.

Optionally, the apparatus includes a refrigeration or cryogenic cooling system configured to cool an interior of the box. Optionally, the refrigeration or cryogenic cooling system is powered at least by gas vented from the dewar vessel(s) contained within the cavities.

Optionally, the box is configured to house a sacrificial gas storage vessel configured to continuously or intermittently vent its contents over a predetermined time period and thus lower its temperature, the box configured to provide for connection of the sacrificial gas storage vessel to an outlet to receive the gas released therefrom and a heat transfer element configured to cool an interior of the box and/or the cavities using the lowered temperature of the sacrificial cavity.

Optionally, the predetermined time period is selected to exhaust its entire contents over an intended use period. Optionally, the sacrificial dewar vessel is predetermined or built into the box. Alternatively the ventilation system controls which dewar is the sacrificial dewar by way of the connection between the ventilation system and an inserted dewar vessel.

Optionally, the heat transfer element comprises at least one of;
- one or more a heat pipes;
- a refrigeration system;
- a cryogenic cooling system; and
- a thermal mass comprising a first part that extends around the sacrificial dewar vessel and a second part that extends around at least one of the cavities, the first part thermally connected to the second part to provide heat transfer between the parts.

The refrigeration/cryogenic cooling system may include a compressor, condenser, and a working fluid.

Optionally, the sacrificial dewar includes a pressure relief valve to provide for venting of its contents and said pressure relief valve is configured at a lower pressure to any other dewar vessel received by the apparatus.

Optionally, the apparatus includes a dewar vessel filling assembly within the box and configured to fill one or more dewar vessels received within the cavities, the filling assembly comprising a releasable filling connector configured to releasably couple to a dewar vessel inserted into one of the cavities and a fill port for receiving a flow of gas to fill the dewar vessel, the assembly configured to direct gas from the fill port to the dewar vessel connected to the connector. Optionally, the fill port comprises a removable connector for connecting to a (cryogenic) dewar vessel filling apparatus.

Optionally, the dewar vessel filling assembly is configured to circulate gas through the dewar vessel(s) when filling the dewar vessel(s) wherein the filling assembly comprises a circulation loop having an inflow section, including the fill port and the filling connector to receive the gas and direct to the or each dewar vessel received within a respective cavity and an outflow section to receive the gas from the or each dewar vessel within a respective cavity for recirculating to the inflow section. Optionally, the ventilation assembly forms at least part of the outflow section when filling the or each dewar vessel. Thus, the dewar vessel filling assembly may connect to the fill port and a vent of the ventilation system.

Optionally, the box includes a carrying structure configured to allow one or more users to carry the dewar vessel storage apparatus.

Optionally, a thermal mass is configured to extend around the at least one of the cavities, the thermal mass comprising a thermally conductive material relative to the insulation of the outer wall and is surrounded by the outer wall. Optionally, the thermal mass has an isobaric volumetric heat capacity of greater than 2 $J.cm^{-3}.K^{-1}$.

Optionally, the box has outer walls formed of cryogenic insulation, wherein the interior of the box is divided, at least in part, by further cryogenic insulation into a plurality of cavities. Optionally, the cavities are configured in terms of size and shape to closely engage with a wall of the dewar vessel inserted therein.

Optionally, at least one of the cavities of the dewar vessel storage apparatus includes a locking mechanism configured to, in a locked state, prevent removal of a dewar vessel located within said cavity and, in an unlocked state, allow for removal of said dewar vessel. Optionally, the locking mechanism is configured to mechanically or magnetically engage with a dewar vessel or a bung at least in the locked state to prevent its removal. The locking mechanism may be positioned in said cavity at a location, such as at a base of the cavity, that is configured to be rendered inaccessible to a user by said dewar vessel when it is inserted into the cavity. This may prevent tampering. Optionally, at least two of the cavities include the locking mechanism. The apparatus may include a locking mechanism controller configured to provide for switching of the or each locking mechanism between a locked and unlocked state. The apparatus may include a user-input element, such as a keypad or biometric sensor, for providing user input to the locking mechanism controller. The locking mechanism controller may be remotely controlled and may include a wired or wireless communication element to provide for said remote control. The locking mechanism or locking mechanism controller may be configured to be programmed with a lock profile, which defines at least one of;
- the time one or more of the locking mechanism(s) are set in a locked or unlocked state;
- the geographic location at which the locking mechanism(s) are set in a locked or unlocked state;
- the state of the locking mechanism(s) based on the presence or absence of a dewar vessel in any one of the other cavities to provide for control of the number of dewar vessels that may be removed at any one time;
- user authentication details, such as an access password or biometric information, required to switch any one or more of the locking mechanisms between the locked and unlocked states.

Thus, the apparatus may include a geolocation determination element (such as satellite geolocation signal receiving circuitry) or a communication element configured to receive geolocation information for providing the above mentioned functionality. The apparatus may include a clock or a communication element configured to receive time information for providing the above mentioned functionality.

Optionally, the apparatus includes a dilution gas element configured to provide a dilution gas with any gas expelled from the dewar vessels through the ventilation assembly. This is advantageous because if the dewar vessels store a flammable gas, the dilution gas can be provided to maintain the concentration of the flammable gas below an associated flammability limit. The dilution gas element may comprise a dilution gas storage vessel configured to expel its contents to dilute any gases leaving the ventilation assembly; or may comprise a pump configured to provide a flow of atmospheric air as the dilution gas. The dilution gas may comprise air or nitrogen or a noble gas, for example. The flow of dilution gas may be controlled based on a gas concentration sensor, such as in the ventilation assembly, and/or based on a gas flow rate sensor of the ventilation assembly. Thus, an appropriate volume of dilution gas may be provided based on the volume of gas being released from the dewar vessels.

The apparatus may include an evacuation element configured to provide for the controlled release of the contents of one or more of the dewar vessels within the apparatus, on receipt of an evacuation signal, which may be received from a tamper detection element or a temperature sensor or a remote device via a communication element, for example. The tamper detection element may be configured to detect unauthorised removal or attempted removal of a dewar vessel from the apparatus. The unauthorised removal may be deemed unauthorised based on a time of removal or attempted removal, a location at the time of removal or attempted removal, an authorisation provided, and/or damage to the apparatus. Accordingly the apparatus may include a clock, a geolocation determination element, a user-input element and/or a motion sensor (or other sensor capable of determining damage) to respectively implement such functionality. The evacuation element may be configured to act on signalling from a temperature sensor. Thus, if the internal or external temperature of the apparatus, or a change in the temperature is above a threshold, the evacuation element may be actuated. Thus, the evacuation element provides a further safety feature in addition to any pressure relief valves provided on the dewar vessels themselves. The evacuation element may be configured to act on signalling received (wirelessly for example) from a remote device, such as a remote computer or controller, via a communication element (which may use cellular or satellite communication means, for example). The evacuation element may be configured to control the flow rate of gas leaving the apparatus from dewar vessels and/or its concentration.

Optionally the apparatus includes a communication element configured to provide for communication with a remote device wherein the apparatus is configured to use the communication element to;
  provide signalling, to the remote device, indicative of consumption of gas or availability of gas, such as the quantity of gas contained within one or more of the dewar vessels and/or the number of dewar vessels that have been removed from the apparatus or used or that remain in the apparatus.

This is advantageous as the signalling can be used by the remote device to account for use of the gas contained within the dewar vessels, bill the user of the apparatus for the gas, and/or determine when to provide for replenishment of the supply of compressed, liquefied or cryo-compressed gas, such as by dispatch of a further apparatus. The billing of the user may use geolocation information, which may be sent via the communication element, in addition to the signalling regarding the quantity of gas or number of dewar vessels removed.

Optionally, the communication element is configured to, based on a measure of the quantity of gas contained within the dewar vessels of the apparatus and a geolocation of the apparatus, provide signalling to one or more remote devices to indicate that one or more dewar vessels are available for providing to another user and the location of the apparatus. This may enable gas sharing or transactions to occur.

Optionally the apparatus includes an electrochemical fuel cell configured to use at least gas vented from the one or more dewar vessels to generate electricity, the electrochemical fuel cell configured to provide said electricity to one or more of;
  a telemetry assembly configured to measure a property of the apparatus or a dewar vessel therein for sending to a remote device;
  a geolocation determination element configured to determine the location of the apparatus;
  a clock;
  a user-input element for receiving user input, such as to access the dewar vessels in the apparatus;
  a tamper detection element configured to determine if the apparatus is being or has been tampered with;
  a communication element configured to provide for communication between the apparatus and a remote device;
  a temperature sensor configured to monitor an internal or external temperature of apparatus; and
  a transaction element configured to provide for the logging of the removal of a dewar vessel as an energy transfer transaction.

According to a second aspect of the invention we provide a dewar vessel storage apparatus configured to hold at least one dewar vessel containing compressed, liquefied gas or cryo-compressed gas, comprising;
  a box having an outer, thermally insulating, wall;
  the box comprising at least one insulating cavity, the or each cavity configured to receive a single dewar vessel and is thermally insulated from any other cavity;
  the or each cavity including a separately removable thermally insulating bung configured to close an open end of its cavity;
  a ventilation assembly comprising at least one conduit within the box configured to provide for venting of gas released from the dewar vessel(s) when stored in the respective cavity(ies) of the box, the ventilation assembly configured to provide a gas outlet flow path from the or each cavity.

Thus, a dewar vessel storage apparatus for at least one dewar vessel may be provided. It will be appreciated that all of the optional features of the first aspect apply equally to this second aspect as appropriate. While we state, in relation to the second aspect, that the apparatus is configured to hold dewar vessels, in other examples, the vessels may be, more generally, gas storage vessels. Further, in other examples, the ventilation assembly is optional.

According to a third aspect of the invention we provide a method of providing a compressed, liquefied or cryo-compressed gas or slush to a point of use comprising;
  providing a dewar vessel storage apparatus as defined in any other aspect;
  providing a plurality of dewar vessels (or at least one) for receiving the liquefied or cryo-compressed gas or slush;
  transporting the dewar vessel storage apparatus having the plurality of dewar vessels (or at least one) stored therein to the point of use; and
  providing for individual removal of one of the dewar vessels at the point of use.

Optionally, the method includes filling the plurality of dewar vessels (or at least one) while stored within the dewar vessel storage apparatus. Optionally, the step of filling includes circulating gas through the dewer vessel(s).

According to a fourth aspect of the invention, we provide a dewar vessel storage apparatus configured to hold at least one dewar vessel containing compressed gas, liquefied gas or cryo-compressed gas, comprising;
  a box having an outer, thermally insulating, wall;
  the box comprising at least one insulating cavity, the or each cavity configured to receive a dewar vessel and is thermally insulated from any other cavity; and
  wherein the apparatus includes a communication element configured to provide signalling to a remote device.

It will be appreciated that all of the optional features of the first and second aspect apply equally to this fourth aspect as appropriate.

Optionally, the signalling is indicative of the availability and/or consumption of said gas stored in the dewar vessels within the apparatus.

This is advantageous as the apparatus provides an effective and convenient means to remotely manage the transfer, usage and exchange of dewar vessels or the gas therein between users and for record keeping. The dewar vessel storage apparatus may have any of the optional features discussed in relation to the aspects above. While we state that the apparatus is configured to hold dewar vessels, in other examples, the vessels may be, more generally, gas storage vessels.

The apparatus may include sensor(s) to determine the presence or absence of dewar vessels within the at least one cavity apparatus to provide the availability and/or consumption information for the communication element. The apparatus may include sensor(s) to determine the amount of gas available within one or more dewar vessels within the apparatus to provide the availability and/or consumption information for the communication element.

Optionally, the apparatus includes a ventilation assembly comprising at least one conduit within the box configured to provide for venting of gas released from the dewar vessel(s) when stored in the respective cavity(ies) of the box, the ventilation assembly configured to provide a gas outlet flow path from the or each cavity.

According to a fifth aspect of the invention we provide a gas distribution system comprising one or more dewar vessel storage apparatuses as defined in the fourth aspect of the invention and at least one remote device, remote from the dewar vessel storage apparatuses and in communication therewith via the communication element.

Optionally the remote device comprises a centralised or distributed server configured to maintain a record of the availability and/or consumption of said gas stored in the dewar vessels of the one or more dewar vessel storage apparatus.

Optionally, the remote device is configured to use said record to provide for billing of users of the dewar vessel storage apparatuses based on the gas consumption.

Optionally, the remote device is configured to maintain the record using block chain technology. This is advantageous as the availability of gas or the consumption of gas in the dewar vessel storage apparatuses may be stored as transactions within the block chain.

Optionally the remote device is configured to receive energy-availability messages from a first of the one or more dewar vessel storage apparatuses, the energy-availability messages comprising an indication that gas is available for transfer to other users or to other dewar vessel storage apparatuses and a geographic location, the remote device configured to, in response to receipt of the energy-availability messages, provide for sending of a message to at least one other dewar vessel storage apparatus comprising the offer of the availability of gas from the first apparatus.

Optionally, the remote device comprises a different dewar vessel storage apparatus. This is advantageous as a peer-to-peer arrangement may be achieved in which information of the availability and/or consumption of said gas stored in the dewar vessels of a particular apparatus may be transmitted between apparatuses either for gas/dewar vessel exchange between gas storage apparatuses or distributed storage of a gas availability/consumption ledger, such as a distributed database or block chain.

There now follows, by way of example only, a detailed description of embodiments of the invention with reference to the following figures, in which:

FIG. 5 shows a flow chart illustrating an example method of providing a compressed, liquefied or cryo-compressed gas or slush to a point of use; and FIG. 6 shows a cross sectional view of a fifth example of a dewar vessel storage apparatus comprising a variety of optional features.

The transport of compressed, liquefied or cryo-compressed gases or slushes is typically provided by large, well-insulated tankers that carry a large quantity (such as 20,000 litres) of the gas and, at a desired locality, transfer a portion of the gas to a local storage facility, which may have containers of a volume of 1000 or more litres. Such tankers may include diesel powered refrigeration or cryogenic units to maintain the gas in its liquefied or cryo-compressed state during transport or may boil off part of the liquid utilising the latent heat of vaporisation to keep the liquid cold.

The dewar vessel storage apparatus of the invention provides for transport of individual, separate quantities of liquefied or cryo-compressed gases or slushes packaged in a plurality of dewar vessels (or vacuum insulated vessels) and stored within the dewar vessel storage apparatus. Slush hydrogen contains some hydrogen in the solid form (13.8 K, 1 atm). The dewar vessels therefore may be cryogenic dewar vessels.

The provision of hydrogen in this way is advantageous as hydrogen is a suitable fuel for electrochemical fuel cell power systems. Compressed hydrogen sources at both 350 bar and 700 bar are limited by gravimetric capacities of about 4 wt.-% and volumetric capacities of about 20 g $H_2$/L. Practical targets for widespread commercialization is >6 wt.-% and >30 g/L. For aircraft applications employing Proton Exchange Membrane (PEM) fuel cell systems, such as Unmanned Aerial Vehicles, gravimetric and volumetric capacity is a critical design factor with a requirement that may be at least 6 wt.-% and 40 g/L.

The boiling point of hydrogen is 20 K (critical temperature=33.2K; critical pressure=13 bar). Thus, a hydrogen storage vessels such as a dewar vessel may allow for continuous boil off of hydrogen to prevent over pressurization of the dewar vessel. Pressure relief valves are used to vent hydrogen vapour when the pressure increases to a pre-set value, which may be about 5 bar. For example, assuming a heat loss of 1 watt, a 5 kg liquid hydrogen dewar vessel within the apparatus 1 may not require boil-off venting until about 5 days of dormancy.

When used to power PEM fuel cell systems, it may be the boil off hydrogen that is supplied to the fuel cell. However, before use and in transit, the boil off must be managed effectively. Thermal management may therefore be important to minimize boil off rates during storage or shipment of liquid hydrogen vessels, while providing sufficient rates to support PEM fuel cell systems (or hydrogen combustion engines). Generally, this balance is achieved by using well insulated dewar vessels that contain internal heating elements.

Figure 1:
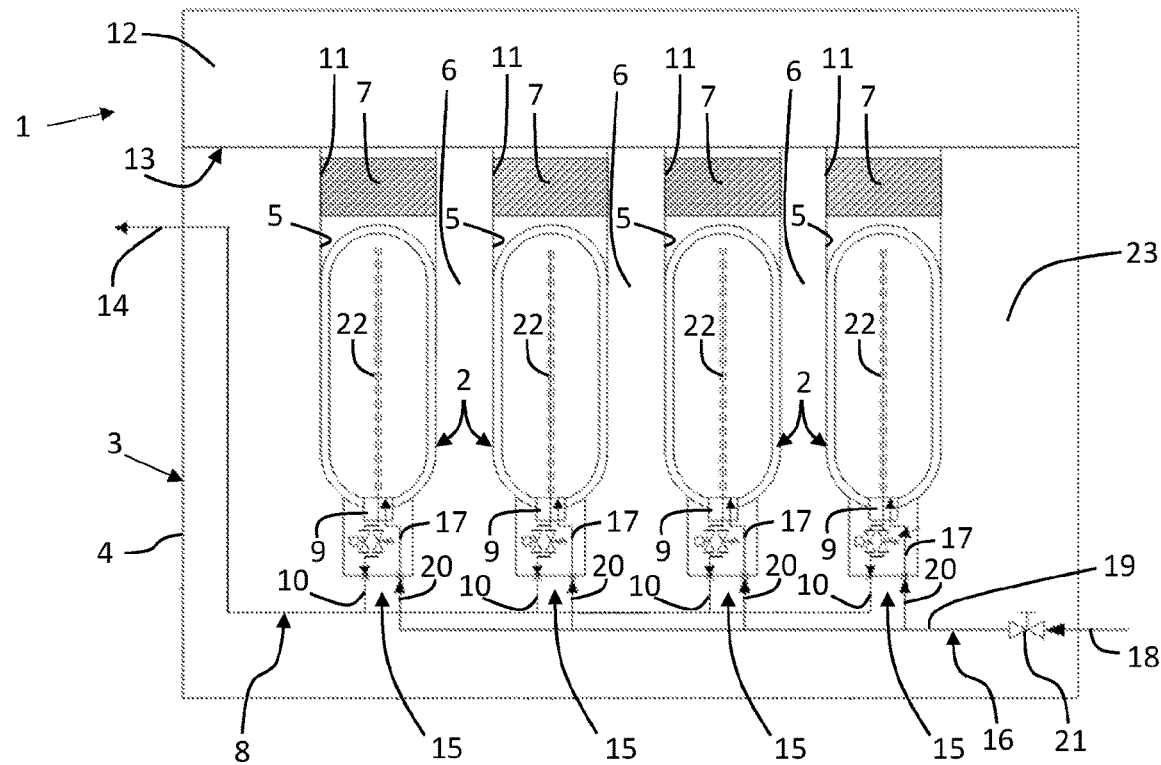
FIG. 1 shows a cross sectional view of a first example of a dewar vessel storage apparatus.

FIG. 1 shows a dewar vessel storage apparatus 1 configured to hold at least two dewar vessels 2. Four dewar vessels 2 are shown which are configured to contain liquefied gas or cryo-compressed gas or slush. In this example, the gas is hydrogen but it will be appreciated that the apparatus 1 has application for storing dewars of other fluids, such as helium or nitrogen among others. The apparatus comprises a box 3 having an outer, thermally insulating, wall 4. The box comprising a plurality of insulating cavities 5, each cavity 5 configured to receive a single dewar vessel 2. Thermal insulation 6 extends between the cavities 5 to thermally insulate them from each other. Each cavity may comprise an elongate bore extending into the box which is surrounded by thermally insulating material. Each cavity 5 has an open end through which the dewar vessel 2 is inserted into the cavity and is closed by a separately removable thermally insulating bung 7. Thus, with the bung 7 in place, the dewar vessel 2 within the cavity may be completely surrounded by insulating material. Given that each cavity 2 has an associated bung 7, an individual cavity can be opened, to remove a dewar vessel for example, without affecting the insulation that surrounds another dewar vessel in a different cavity. Further, the apparatus 1 includes a ventilation assembly 8 within the box configured to provide for venting of gas from the dewar vessels 2 when stored in the respective cavities 5 of the storage apparatus 1. The ventilation assembly 8, in this example, provides a conduit 10 to each cavity 5 for connection to each dewar vessel 2 which provides a gas outlet flow path from each cavity 5.

The arrangement of the apparatus and the way of packaging the gas in individual dewars is particularly advantageous as an end user is able to remove one of the dewar vessels without substantially affecting the insulation that surrounds any of the others in the box. This is particularly convenient as each dewar vessel may be sized to fit a particular application. Therefore, a user has a ready supply of dewars, thermally insulated in the box, to remove as and when required. For example, the gas may be hydrogen and the application may be fuel cell powered autonomous aircraft. In this example a user can remove a dewar vessel from the box, load it into the aircraft to act as a fuel source, and launch the aircraft. Thus, the dewar vessels comprise a removable fuel source or tank for an application. When the autonomous aircraft returns or another aircraft is to be launched, a further dewar vessel can be removed from the box and installed as described above.

The box 3 may be cuboidal although it may be cylindrical. It will be appreciated that the outer wall 4 of the box 3 and any walls interior to the box, such as those separating the cavities, and the bungs 7 may be thermally insulated sufficiently to store a liquefied gas or cryo-compressed gas in a dewar vessel, for at least 1 hour, 5 hours, 10 hours, 12, 24, 72 or more hours without losing more than 10% of the contents due to boil-off (in a 25 deg C ambient environment). The outer, thermally insulating, wall may comprise a multi-layer Insulation (MLI) or a super insulation (SI) material inside a high or soft vacuum respectively, a vacuum insulated wall or panel (VIP) or be formed of a plurality of vacuum insulated panels or combination of the above. The interior walls may also include MLI, SI or VIP. Thus, the box 3 may be considered to be a dewar vessel for receiving a plurality of dewar vessels 2. The walls 4 or panels may be of metal, such as stainless steel, and include a hollow interior for the vacuum. The walls or panels may be infilled with any appropriate insulating material, such as an aerogel, MLI or SI. The thermal insulation may reduce or minimize heat transfer from the atmosphere via radiation through the insulation, conduction through the insulation and other heat losses through hydrogen inlet and outlet fittings and conduits. Suitable insulation arrangements may comprise a vacuum jacket or panel utilizing a multilayer insulation (MLI) blanket in the vacuum gap; a vacuum jacket or panel with no MLI; a single-walled tank utilizing external spray on foam insulation; and a single-walled tank utilizing aerogel insulation. The vacuum jacket or panel with and without a MLI blanket may provide the lightest thermal insulation design solution.

The cavity 5 may be configured to receive a specific size of dewar vessel and thus may include a head space adjacent the open end of the cavity once the dewar vessel has been received therein. The head space may include a wall 11 that is complimentary to an outer surface of the bung 7 such that the bung is sealingly received within the cavity. The seal formed between the bung 7 and the cavity 5 may be hermetic. The head space wall 11 and/or the bung 7 may include sealing structures, such as seal(s) to seal therebetween. The cavities 5 may be substantially cylindrical, cuboidal or any other shape that may be complimentary to the dewer vessel it is configured to receive. Further, the bung may be configured to fit closely adjacent to, such as against, the dewer vessel 2 to reduce the quantity of air surrounding the dewer vessel. For example, the bung 7 may fill substantially all of the space around the dewar vessel, which may reduce the quantity of air that may freeze around the outside of the dewar. Thus, a lower face of the bung may be complimentary to the shape of the base (the end opposite the valves) of the dewar vessel 2. Further, when the dewar vessel is removed and the bung replaced, the air in the space will cool/liquefy and a partial vacuum may form. If the bung is sealed then it will prevent further air entering the cavity. The bung 7 may include a pressure control/relief valve.

The bung 7 and/or cavity 5 may include conduits, which may terminate in ports, to provide for introduction of a storage fluid within the bunged cavity and around the dewar vessel. The storage fluid may be such that it does not condense or freeze in use when subjected to the cold conditions surrounding the dewar vessel 2. Alternatively, the conduits may provide for removal of air from the bunged cavity to form a vacuum/partial vacuum around a dewar vessel stored within the cavity.

In this example, the dewar vessel storage apparatus 1 includes a removable lid 12. Thus, the box 3 includes an aperture 13 configured to provide access to the bungs 7 and cavities 5 and the aperture 7 is closed by the removable lid 12. The removable lid 12 may comprise a vacuum insulating panel or may be of an insulating material as described above in relation to the box 3. In other examples, it is not specifically configured to provide for thermal insulation, although by virtue of its material it may have some thermal insulating properties. The lid 12 may include an engagement structure, such as a rim or flange, to engage with a complimentary engagement structure on the box 4, such as at the perimeter of the aperture 13. The engagement structure may comprise hinges and/or clasps and/or slots to secure the lid in place during use. In other examples, the lid 12 is provided without the bungs 7. Further, the bungs 7 may be configured to close a subset of the cavities.

The dewar vessels 2 may be of known design and may be configured to hold at least or up to 0.5, 1, 1.5, 2, 2.5, 3, 3.5, 4, 4.5 or 5 kg of hydrogen.

The dewar vessels 2 may include pressure release valves to release gas therein to relieve the pressure within the vessels as the fluid within the dewar vessel boils off. Thus, the ventilation assembly 8 of the apparatus 1 is configured to receive said gas so that uncontrolled accumulation of gas within the apparatus 1 is prevented. The pressure release valves may form part of a fluid outlet 9 of the dewar vessels 2. In this example, the ventilation assembly comprises a network of conduits within the box 3 that connect to each cavity 5 and provide a flow path for any gas within the cavities 5 to flow into the network of conduits and (possibly) to atmosphere via a vent 14 that extends through the outer wall 4.

In particular, the ventilation assembly 8 comprises a manifold having a common flow path conduit 16 that has a plurality of branches extending therefrom for connecting to each cavity 5. The common flow path conduit 16 connects to the vent 14. It will be appreciated that other network arrangements may be used such as each cavity 5 connecting to a separate conduit that provides a direct vent to atmosphere or elsewhere. Further, it will be appreciated that the vent may not open to atmosphere. Instead, the ventilation assembly 8 may open into a gas storage volume (not shown) for storing the gas from the dewar vessels at a higher temperature.

The outlet flow path 10 may thus connect to the cavity 5 or may be configured to connect to the dewer 2 within the cavity 5.

Further, in this example, the ventilation assembly 8 includes a plurality of releasable connectors 15, each cavity 5 including a connector for releasably coupling to a dewar vessel. The connector 5 may be a standard connector or otherwise compatible with the structure of the inlet/outlet of a dewar vessel 2. Thus, when a dewar vessel 2 is inserted into the cavity it releasably and securely engages with the connector 15, which provides a sealed and direct connection to the conduits of the ventilation assembly 8. Thus, when the pressure relief valve of a dewar vessel 2 is actuated by excessive pressure due to gas therein boiling off, said released gas is received into the ventilation assembly 8 through the connector 15.

The releasable connectors 15 are arranged at a base of each cavity 5 such that a connection is made between the dewar vessel 2 and the connector 15 of the ventilation assembly 8 when the dewar vessel 2 is substantially completely inserted into said cavity 5. In other examples, the connectors may be arranged elsewhere in each cavity 2. However, providing the connectors 15 at the base of the cavity is advantageous as the walls of the cavity guide the dewar vessel into engagement with the connector 15.

While in the example of FIG. 1, the vent 14 is to atmosphere, in other examples the ventilation assembly 8 may connect the gas outlet flow path 10 from at least one or all of the cavities 5 to a burner or catalyser or fuel cell for consuming the vented gas (not shown).

In this example, a neck of the dewar vessels 2 includes the pressure relief valves and any other valves required to control the filling and dispensing of fluid from the dewar vessels. On coupling of the dewar vessel to the connector 15, a sealed connection is made and, on removal, the conduits of the ventilation system may be self-sealing.

In another example, the ventilation assembly 8 includes a controllable valve for controlling the receipt of gas into the gas outlet flow path of at least one or more or all of the cavities or dewars vessels. Preferably, the dewar vessel includes the controllable valve. The controllable valve may comprise a solenoid valve. The valve or valves may be used to close off the connection to the ventilation assembly 8 for a particular cavity 5 or dewar vessel 2, such as one that does not contain a dewar vessel 2 or due to a fault. The ventilation assembly 8 may provide for a vent for each cavity or groups of cavities.

The apparatus 1 is further configured to provide for filling of the dewar vessels 2 in situ within the box 3. The filling of the dewar vessels 2 while loaded in the box 4 may be advantageous as the interior walls/surfaces of the box 3, such as those in closest contact with the dewar vessels 2 can be cooled by the dewar vessels as they are filled. Accordingly, the apparatus 1 includes a dewar vessel filling assembly 16 configured to fill, in this example, each of the dewar vessels received within the cavities 5. The filling assembly 16 comprises a releasable filling connector configured to releasably couple to a fluid inlet 17 of each dewar vessel 2. In this example, the connector 15 of the ventilation assembly 8 provides for connection to the fluid inlet 17 of each dewar vessel. Thus, the connector 15 may have separate flow paths for gas leaving the dewar vessel 2 and gas entering the dewar vessel 2. In other examples, separate connectors are provided for the ventilation assembly and the filling assembly. The filling assembly 16 further comprises a fill port 18 for receiving a flow of gas from a source external to the apparatus 1 to fill the dewar vessels. The fill port 18 provides a connection to the filling assembly 16 through the outer wall 4 of the box 3. An external filling apparatus may connect to the fill port 17.

Accordingly, the fill port may include a connector part complimentary to connector part on the external filling apparatus. A network of conduits, such as a manifold 19, within the box is configured to direct gas from the fill port 17 to the dewar vessels 2 via gas inlet flow paths 20 for each of the cavities that terminate in the connectors 15.

The manifold 19 includes a control valve 21 for controlling the flow of gas into the filling assembly 16 through the fill port 18. The valve 21 may be a solenoid valve or a one-way valve to prevent flow out of the fill port 18.

Further, in this example, the apparatus 1 is configured to circulate gas through the dewar vessels when filling. This technique may be advantageous for ensuring that the temperature of the vessels themselves and the filling assembly is sufficiently cold to allow the vessels to be filled to their capacity. Thus, the filling assembly 16 comprises an inflow section which delivers fluid into each of the dewar vessels 2. The dewar vessels 2, in this example, have a divider 22 which separates the fluid inlet 17 from the fluid outlet 9. The ventilation assembly, connected to the fluid outlet 9, forms an outflow section to receive fluid from the vessels during the filling processes. The fluid flows to vent 14 which, during filling, may be connected to the external filling apparatus which may recirculate the gas into the inflow section.

In other examples, the filling assembly 16 may have dedicated inflow and outflow sections distinct from the ventilation assembly 8.

The dewar vessels may be pre-cooled using a coolant such as liquid nitrogen prior to disposing in each cavity of the apparatus 1.

The external filling apparatus and/or the dewar vessels and/or the apparatus 1 may be provided with suitable authentication mechanisms to prevent tampering and to confirm and authenticate the filling history and ownership of each dewar 2. The authentication system may use RFID or other sensors mounted within the apparatus, such as within each cavity. The apparatus 1 is configured to be transported easily. For example, the apparatus 1 may be configured to be carried by a user. Accordingly, the dewar vessel storage apparatus 1 may include a carrying structure (not shown), such as a handle(s) or hand sized indents to allow one or more users to carry the dewar vessel storage apparatus 1.

It will be appreciated that the dewar vessel storage apparatus 1 is provided with sufficient insulation or insulation of a particular performance to effectively perform its function providing for storage of dewar vessels during transportation. Thus, from filling to the delivery to the user the insulating performance may be such that at least 90% of the contents of the dewar vessels at filling is available at delivery. It will be appreciated that other performance criteria may be used. For example, the outer walls of the box may have a thermal performance so as to achieve a thermal input from the surroundings of less than 100 W (or less than 80 W, or less than 60 W, or less than 40 W) when at cryogenic temperatures.

An example size of the dewar vessel storage apparatus may be 1.2×1×1 m with an insulation thickness (of at least the outer wall) of at least than 50 mm. Such a box may contain twelve dewar vessels. The heat loss from the box should be controlled by insulation to allow extended storage time of the cryogenic fluid. If a high vacuum MLI insulation is used it may be possible to reduce the heat gain to a few watts. With the correct configuration, storage times could be achieved of at least 12 hours, 1 day or 1 week or more if an active cryo-cooler is used. The interior of the box 3, inward of the outer walls, may be substantially thermal insulation 23.

Figure 2:
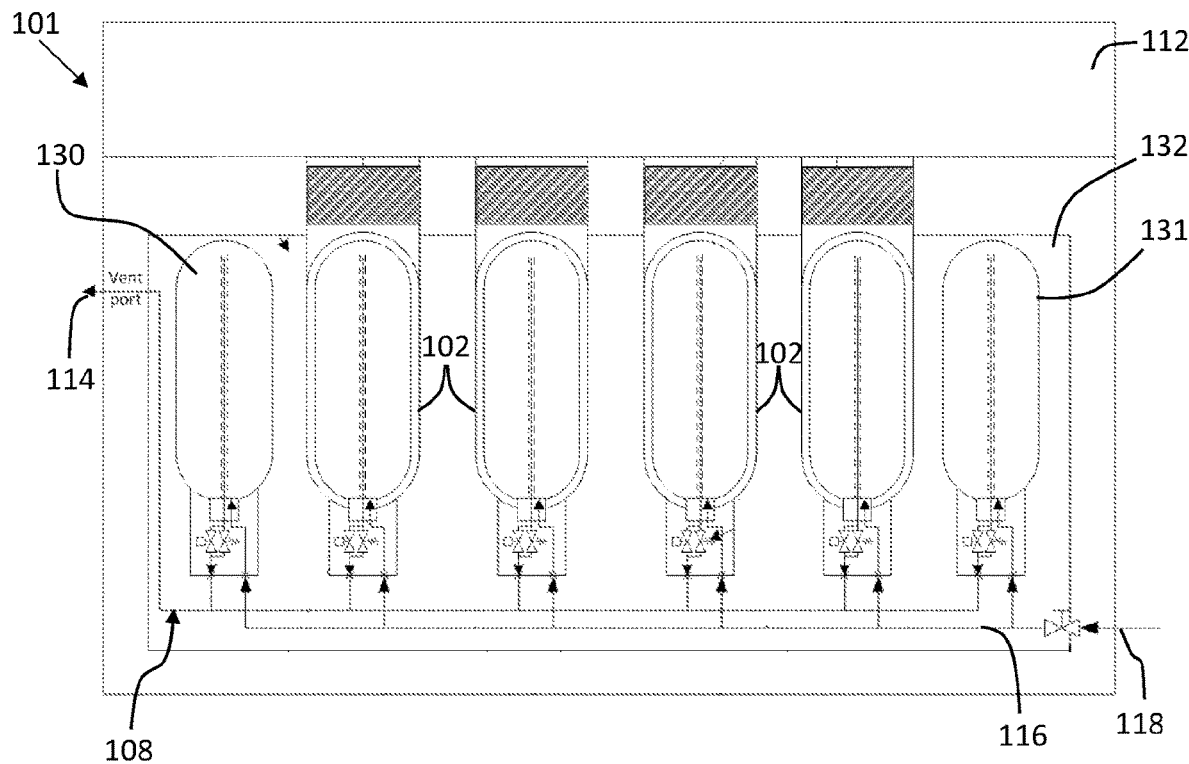
FIG. 2 shows a cross sectional view of a second example of a dewar vessel storage apparatus including a sacrificial dewar.

FIG. 2 shows a second example in which a sacrificial gas storage vessel, such as a sacrificial dewar vessel, is provided to assist in maintaining the other dewar vessels 2 within the box at a low temperature. The same reference numerals have been used for like features except that "100" has been added to them.

The one or more sacrificial gas storage vessels 130 and 131 are allowed to expel their contents in a controlled manner such that the cooling effect due to evaporation of the gas out of the sacrificial gas storage vessels can be used to cool the "normal" dewar vessels 102. The sacrificial dewar vessels 130, 131 may be located adjacent the outer wall 4 or outwards of the other dewar vessels 2. The pressure in the sacrificial dewar vessels may be lower than the others.

The dewar vessel storage apparatus 101 further includes a thermally conductive element 132 that surrounds the sacrificial gas storage vessels 130, 131 (or the cavity within which they are located) as well as at least one of other dewar vessels 102. In this example, a single thermally conductive element 132 surrounds all of the cavities 105 and the sacrificial gas storage vessels 130, 131. The thermally conductive element 132 may be of metal, such as aluminium. The thermally conductive element provides for transfer of heat between the dewar vessels 102 and the sacrificial gas storage vessels 130, 131.

In the example of FIG. 2, the sacrificial dewar vessels 130, 131 are non-removable and thus fixed within the thermally conductive element 132 and connect to the ventilation assembly 108 and filling assembly 116. However, in other examples, the sacrificial gas storage vessels 130, 131 may be removable. Thus, the apparatus 101 may include "sacrificial" cavities designated to receive the sacrificial dewar vessels 131, 132. The "sacrificial" cavities may be substantially the same as the other cavities. They may differ in that the ventilation assembly 108 may be configured differently to receive the sacrificial gas vented from the sacrificial dewar vessels. Thus, the connector 115 or an element associated with the connector within a sacrificial cavity may provide for release of the gas within the sacrificial gas storage vessel at a particular predetermined rate.

The ventilation assembly 16 may include means to actively control the release of gas from the sacrificial gas storage vessel(s) 130, 131, which may be in response to a sensor input, such as a temperature sensor. The apparatus 101 may be configured or the sacrificial dewar vessel may be configured to continuously or intermittently vent its contents over a predetermined time period. The predetermined time period may be selected to exhaust its entire contents over an intended use period. For example, if the dewar storage apparatus is configured to transport the dewars over a 5 hour journey, the predetermined time may be 5 hours or based on the expected journey time or based on a "rating" of the dewar storage apparatus.

While the thermally conductive element 132 for providing heat transfer between the dewar vessels 102 and the sacrificial dewar vessels 130, 132 comprises a block in this example, in other examples, it may comprises one or more heat pipes or a refrigeration or cryogenic cooling system. Thus, the refrigeration/cryogenic cooling system may include a compressor, condenser and a working fluid that is cooled by the sacrificial gas storage vessel(s).

In the example of FIG. 2, the sacrificial gas storage vessels are dewar vessels 130, 131 similar to the "normal" dewar vessels 102, as they are adapted to hold the same liquefied or cryo-compressed gas or slush. The vessels 102, 130 are all connected to the filling assembly 116 and are configured to be filled together. As in the example of FIG. 1, the gas is circulated through the vessels 102, 130 using the ventilation assembly 108 as an outflow section. Once filled, the external filling apparatus (not shown) may be disconnected from the fill port 118 and vent port 114 and the apparatus 101 may be ready for transport or storage of the dewar vessels 2. In this example, the pressure relief valve of the sacrificial dewar vessels 130, 131 is configured at a lower pressure than the "normal" dewar vessels. Alternatively, the pressure relief valves may be set to the same value, but by virtue of locating the sacrificial dewer vessels adjacent an outer wall, they may release their gas quicker than the other dewer vessels. In other examples, the apparatus 101 is configured to control the rate at which the gas is released from the sacrificial dewer vessels 130, 131.

Figure 3:
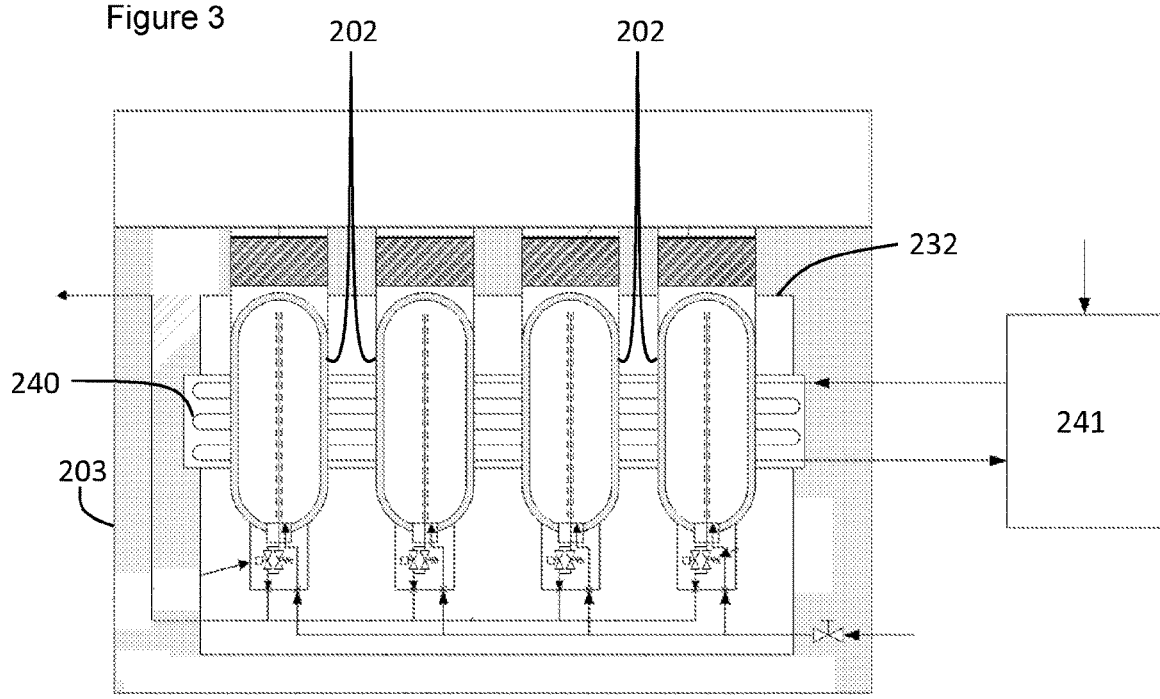
FIG. 3 shows a cross sectional view of a third example of a dewar vessel storage apparatus including means for providing active refrigeration/cryogenic cooling.
Figure 4:
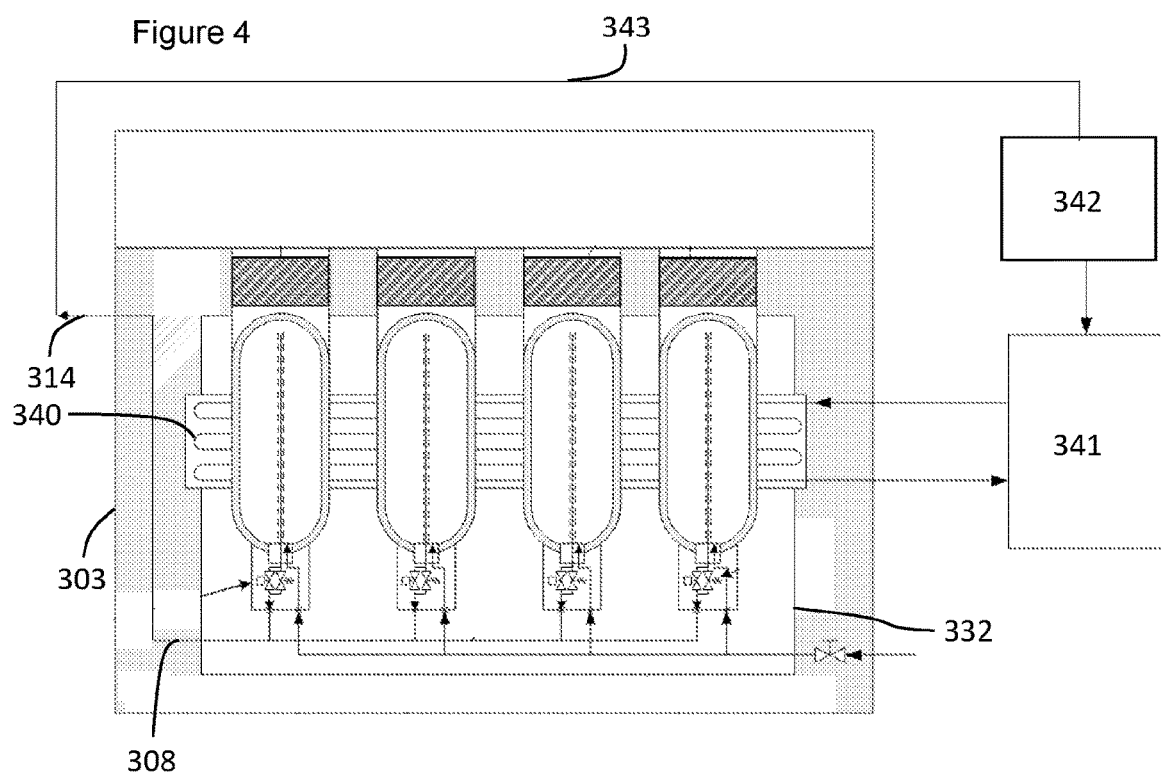
FIG. 4 shows a cross sectional view of a fourth example of a dewar vessel storage apparatus including a fuel cell.

FIGS. 3 and 4 show third and fourth example of the dewar vessel storage apparatus. The same reference numerals have been used for like features except that "200" has been added to them for FIG. 3 and "300" has been added to them for FIG. 4.

In these examples a thermally conductive element 232, 332 is provided within the box 203, 303. The thermally conductive element is spaced inwardly of the outer walls 204, 304 such that it is thermally isolated from the exterior of the box. In this example the thermally conductive element comprises a thermal mass of aluminium. A high thermal mass may advantageously control temperature fluctuations. The thermally conductive element 232, 332 includes a heat exchanger 240, 340. The heat exchanger is provided in direct or indirect thermal contact, such as via the thermally conductive element 232, 332, with the dewar vessels 202, 302. The heat exchanger 240, 340 is configured to receive a working fluid, comprising a suitable refrigerant/cryogenic working fluid, which is cooled using a cryo-cooling apparatus 241, 341. In these examples, the cryo-cooling apparatus 241, 341 is external to the box 203, 303, although it may be integrated therein. The cryo-cooling apparatus 241, 341 receives a supply of power for cryo-cooling the refrigerant/cryogenic working fluid for supply to the heat exchanger.

The example of FIG. 4 differs from that shown in FIG. 3 in that an electrochemical fuel cell 342 is provided to generate, at least in part, the electrical power required by a refrigeration system, such as cryo-cooling apparatus 341. The fuel cell 342 is arranged to use, as its fuel, the hydrogen that is vented from the ventilation assembly 308. In this example, a conduit 343 is provided to direct the hydrogen gas leaving the vent 314 to an anode of the fuel cell 342. A cathode of the fuel cell 342 is configured to consume oxygen from atmospheric air as its oxidant. This arrangement may be advantageous as an increase in the gas leaving the ventilation assembly 308 may be indicative of the temperature in the apparatus 301 rising. As the gas is supplied to the fuel cell 342 it automatically reacts by generating electricity to power the cryo-cooling apparatus to cool the apparatus 301. Thus, a closed loop feedback loop is provided by the ventilation assembly 308, the conduit 343, the fuel cell 342, the cryo-cooling apparatus 341 and the heat exchanger 340. Such an arrangement may be advantageous in combination with a sacrificial dewer vessel, which may provide the gas/hydrogen to power the fuel cell 342.

In other examples, the fuel cell 342 may be configured to use the gas vented from the one or more dewar vessels to generate electricity for a different purpose, such as for sensors to monitor the temperature of the apparatus 1. For example, the heat exchanger 340 and cryo-compressor 341 may not be present. The fuel cell 342 may be used to power a display or a user interface disposed on the dewar vessel storage apparatus or any other load. The fuel cell 342 may power circuitry to determine at least one operating parameter of one or more of the dewar vessels and may store the data which is representative of the at least one operating parameter of the dewar in a memory device located on the dewar or as part of the apparatus for display or recording. The fuel cell 342 may be configured to provide said electricity to one or more of; a telemetry assembly configured to measure a property of the apparatus or a dewar vessel therein for sending to a remote device; a geolocation determination element configured to determine the location of the apparatus; a clock; a user-input element for receiving user input, such as to access the dewar vessels in the apparatus; a tamper detection element configured to determine if the apparatus is being or has been tampered with; a communication element configured to provide for communication between the apparatus and a remote device; a temperature sensor configured to monitor an internal or external temperature of apparatus; and a transaction element configured to provide for the logging of the removal of a dewar vessel as an energy transfer transaction.

In any of the above examples, the dewar storage apparatus may include a thermal mass element configured to surround one or more of the cavities 5. The thermal mass may be cooled to a temperature, such as during filling of the dewar vessels in situ, that assists in maintaining the dewar vessels 2 at a desired temperature. The thermal mass element may have an isobaric volumetric heat capacity of greater than 2 $J.cm^{-3}.K^{-1}$.

It will be appreciated that the features described in relation to the above embodiments may be provided in any combination. The filling assembly, a particular layout of the ventilation assembly, a particular layout to provide a sacrificial gas storage vessel, the thermal mass element, the heat exchanger, the number and layout of the cavities, the refrigeration/cryogenic cooling system and/or the fuel cell, at least, may be provided in any combination.

FIG. 5 shows a flow chart illustrating the method of providing a dewar vessel storage apparatus as described above 500; providing a plurality of dewar vessels for receiving the liquefied or cryo-compressed gas/slush 501; transporting the dewar vessel storage apparatus having the plurality of dewar vessels stored therein to the point of use 502; and the dewar vessel storage apparatus providing for individual removal of one of the plurality of dewar vessels at the point of use 503 without disturbing the insulation provided for another of the dewar vessels.

FIG. 6 shows a storage apparatus 601 for one or more gas storage vessels which, in this example comprise dewar vessels, although they may comprise single skinned vessels. The apparatus 601 is substantially similar to that shown in FIG. 1 and reference numerals with the addition of "600" are used to designate like parts. In this example, the apparatus 601 includes a communication element 660 configured to provide signalling to a remote device 661 (via wireless communication for example). In this example, the signalling is indicative of the availability and/or consumption of said gas stored in the dewar vessels 602 within the apparatus 601. In other examples, the communication element 660 is used for security or safety reasons, as will be described below.

The remote device 661 may comprise a server configured to monitor the one or more of the apparatuses 601 and optionally provide for the billing of users of the apparatus for use of the gas contained therein based on the signalling received from apparatus 601. The server 661 may control the dispatch of another storage apparatus 601 if the quantity of gas or rate of usage of gas in the current storage apparatus 601 exceeds a threshold.

The apparatus 601 in this example, further includes a geolocation element 662, which may comprise a GPS or other satellite geolocation receiver or a land-based geolocation determination element. The location of the apparatus 601 may be provided for communication by communication element 660. The billing of the user for the consumption of gas may use the geolocation information. Alternatively, the geolocation information may be used for security purposes as explained below.

A proximity or other type of sensor 663 is provided associated with each cavity (although only one is shown in FIG. 6 for simplicity) to detect whether or not the dewar vessel in the cavity has been removed. The sensor 663 may be in communication with the communication element 660, which may, on detection of the removal of the dewar vessel, provide signalling to the remote device for billing, accounting or security purposes. In a further example, not shown, the sensor 663 comprises a dewar vessel contents measurement sensor, which may use ultrasonic pulses to determine the quantity of gas within the dewar vessel, which may be communicated to the communication element 660 for billing, accounting, safety/performance monitoring or security purposes.

Further, each cavity 605 is provided with a locking mechanism 664, although only one is shown for simplicity. The locking mechanism is configured to engage with a dewar vessel 602 and, when in a locked state, prevent removal of a dewar vessel 602 from its cavity 605 and, in an unlocked state, allow for removal of said dewar vessel 602. In this example, the locking mechanism includes a retractable bolt 665 to physically engage a complimentary indentation of the vessel 602. Optionally, the locking mechanism provides a magnetic engagement with a dewar vessel, which may operate through the insulation of cavity. The locking mechanism may engage with the bung 607. Access to the base of the cavity where the locking mechanism is located is via the cavity. Thus, when a dewar vessel 602 is mounted therein, user access to the locking mechanism is restricted, which may prevent tampering.

A locking mechanism controller 672 is provided to control the locking mechanisms 664 of each of the cavities. The controller 672 is configured to receive user input from a user-input element 666, such as a keypad or biometric sensor. In response to a request to unlock the dewar vessel(s) 602 via the keypad or in response to a correct password or authenticated biometric information from the element 666, the locking mechanism controller 672 may switch one or more of the locking mechanism 664 to the locked or unlocked state. In this example, the locking mechanism controller 672 is connected to the communication element 660, which may provide for remote control of the locking mechanism. The locking mechanism controller 672 may be programmable to lock or unlock in the dewar vessels 602 in accordance with certain criteria. Thus, locking mechanism controller 672 may programmable with a lock profile, which defines at least one of;

the time one or more of the locking mechanisms are set in a locked or unlocked state (the time may be received from a clock or from the elements 662 or 660);

the geographic location (using geolocation element 662) at which the locking mechanisms are set in a locked or unlocked state;

the state of the locking mechanism(s) based on the presence or absence of a dewar vessel in any one of the other cavities (based on sensors 663, for example) to provide for control of the number of dewar vessels that may be removed at any one time;

user authentication details, such as an access password or biometric information (from element 666 for example), required to switch any one or more of the locking mechanisms between the locked and unlocked states.

FIG. 6 also show the inclusion of a dilution gas element 667. As described above, a ventilation assembly 608 may be provided to receive any gas exhausted from the dewar vessels 602. The gas may be a flammable gas, such as hydrogen, and the dilution gas element is configured to ensure that the concentration of the gas at the outlet 614 does not exceed a predetermined threshold, such as one based on the flammability limit of the gas. In this example, the dilution gas element 667 comprises a pump that receives atmospheric air at 668 to maintain a suitable concentration. In other examples, a dilution gas source may be stored within the apparatus 601.

In this example, the pump 667 receives a signal from a gas flow rate sensor 669 mounted in the ventilation assembly 608. The greater the flow rate of gas leaving the ventilation system the greater the duty of the pump 667. Likewise, if a stored dilution gas is provided rather than or in addition to the pump, the sensor 669 may control the exhaustion rate from the dilution gas source.

The apparatus 601 may include an evacuation element 670 configured to provide for the controlled release of the contents of one or more of the dewar vessels 602 within the apparatus 601, on receipt of an evacuation signal. The evacuation signal may be provided for safety reasons based on the temperature of the apparatus 601 from a temperature sensor 672. The temperature sensor 672 is configured to measure the external temperature of the apparatus 601 but may alternatively or additionally measure the temperature inside the apparatus 601. The evacuation signal may be received from a tamper detection element 670 or from the remote device 661 via the communication element 660. Thus, if the internal or external temperature of the apparatus, or a change in the temperature is above a threshold, the evacuation element may be actuated.

The tamper detection element 670 may be configured to detect unauthorised removal or attempted removal of a dewar vessel from the apparatus. Thus, the tamper detection element 670 may receive data from the locking mechanism 664 and/or the sensors 663. The unauthorised removal may be deemed unauthorised based on a time of removal or attempted removal. A location, received from the element 662, at the time of removal or attempted removal, may be used to determine whether the removal is unauthorised. Unaccepted authorisation details provided via the input element 666 may result in generation of the evacuation signal. Further, the tamper detection element 670 may detect movement of the box above a threshold or use integrity sensors to determine damage to the apparatus 601.

The evacuation element 670 may be configured to act on signalling received (wirelessly for example) from a remote device 661 via the communication element 660. The evacuation element may be configured to control the flow rate of gas leaving the apparatus from dewar vessels and/or its concentration.

In this example the evacuation element 670 is connected to a plurality of actuators of the ventilation assembly 608 that are each associated with one of the cavities 605. The actuators (not shown) are configured to actuate the pressure relief valve of the dewar vessel 602 such that it evacuates its contents through the ventilation assembly 608.

The provision of a communication element 660 in each storage apparatus 601 provides means for the formation of a gas distribution system 675 comprising one or more dewar vessel storage apparatuses 601 and at least one remote device 661.

As described above, the remote device 661 may comprise a centralised or distributed server configured to maintain a record of the availability and/or consumption of said gas stored in the dewar vessels of the one or more dewar vessel storage apparatus. Alternatively or in addition the remote device may provide signalling via the communication element 660 to control the locking mechanism 664, the evacuation element 670 or other functionality of the apparatus 601.

In the example where the remote device 661 is sent consumption information, the remote device 661 may be configured to use said record to provide for billing of users of the dewar vessel storage apparatuses based on the gas consumption. Optionally, the remote device 661 is configured to maintain the record using block chain technology and may thus be associated with miners and any other apparatus required to implement the block chain. With a plurality of storage apparatus 601 in circulation, the communication element 660 may be used to provide for exchange or transfer of dewar vessel(s) 602 to the storage apparatus of other users. Therefore, if a user is low on gas in their storage apparatus, they may identify and find another user with which to perform a transaction.

Optionally the apparatus 601 is configured to send the remote device 661 an energy-availability messages indicating that gas is available for transfer to other users or to other dewar vessel storage apparatuses. The message may include a geographic location from element 662. The remote device 661 may then maintain a database of this information that can be viewed by other apparatus 601 users or may be configured to send a message to other dewar vessel storage apparatus (or at least ones that have indicated a demand for gas via a message) comprising the offer of the availability of gas from the first apparatus.

Further, it will be appreciated that the remote device 661 may not be a server and may be a further, different dewar vessel storage apparatus. Thus, the apparatus 601 with their respective communication elements 660 form a peer-to-peer arrangement. The provision of gas sharing/exchange/transactions may be achieved by transmission of messages between apparatuses (or a central server). The distributed nature of the apparatuses 601, 661 may provide for distributed storage of a gas availability/consumption ledger, such as a distributed database or block chain, to account for energy availability and/or consumption from each apparatus 601, 661.

The invention claimed is:

1. A dewar vessel storage apparatus configured to hold at least two dewar vessels containing liquefied gas or cryo-compressed gas, comprising;
   a box having an outer, thermally insulating, wall; the box comprising a plurality of insulating cavities, each cavity configured to receive a single dewar vessel and is thermally insulated from each other cavity; each cavity including a separately removable thermally insulating bung configured to close an open end of its cavity;
   a ventilation assembly comprising at least one conduit within the box configured to provide for venting of gas released from the dewar vessels when said dewar vessels are stored in the respective cavities of the box, the ventilation assembly configured to provide a gas outlet flow path from each cavity;
   in which each cavity's open end and its associated bung is configured complimentary to the shape of the dewar vessel it is configured to receive such that there is substantially no air space when the dewar vessel is received in the cavity and the bung is in place.

2. A dewar vessel storage apparatus according to claim 1, in which the outer, thermally insulating, wall and/or an insulation between each cavity comprises at least one of;
   a vacuum insulated panel utilizing a multilayer insulation blanket in a vacuum gap;
   a vacuum jacket or panel with no multilayer insulation blanket in the vacuum gap;
   a wall utilizing spray on foam insulation; and a wall incorporating aerogel insulation.

3. A dewar vessel storage apparatus according to claim 1, in which the ventilation assembly includes a releasable connector configured to releasably couple the outlet flow path of one of the cavities to a pressure relief valve of a dewar vessel inserted into said one of the cavities for receiving boiled-off gas from the dewar vessel.

4. A dewar vessel storage apparatus according to claim 3, in which the releasable connector is arranged at a base of one cavity such that a connection is made between the dewar vessel and the ventilation assembly when the dewar vessel is substantially completely inserted into said cavity.

5. A dewar vessel storage apparatus according to claim 1, in which the ventilation assembly is configured to; connect the gas outlet flow path from at least one of the cavities to atmosphere; and/or connect the gas outlet flow path from at least one of the cavities to burner or catalyser for consuming the vented gas; and/or connect the gas outlet flow path from at least one of the cavities to an electrochemical fuel cell, the fuel cell configured to use gas vented from the one or more dewar vessels to generate el electricity; connect the gas outlet flow path from at least one of the cavities to a gas store.

6. A dewar vessel storage apparatus according to claim 1, in which the box is configured to house a sacrificial gas storage vessel configured to continuously or intermittently vent its contents over a predetermined time period and thus lower its temperature, the box configured to provide for connection of the sacrificial gas storage vessel to an outlet to receive the gas released therefrom and a heat transfer element configured to cool an interior of the box and/or the cavities using the lowered temperature of the sacrificial cavity.

7. A dewar vessel storage apparatus according to claim 1, comprising a dewar vessel filling assembly within the box and configured to fill one or more dewar vessels received within the cavities, the filling assembly comprising a releasable filling connector configured to releasably couple to a dewar vessel inserted into one of the cavities and a fill port for receiving a flow of gas to fill the dewar vessel, the assembly configured to direct gas from the fill port to the dewar vessel connected to the connector.

8. A dewar vessel storage apparatus according to claim 1, in which a thermal mass is configured to extend around the at least one of the cavities, the thermal mass comprising a thermally conductive material relative to the insulation of the outer wall and is surrounded by the outer wall; and,
   in which the thermal mass has a isobaric volumetric heat capacity of greater than 2 $J.cm^{-3}K^{-1}$.

9. A dewar vessel storage apparatus according to claim 1, in which at least one of the cavities of the dewar vessel storage apparatus includes a locking mechanism configured with two states, in a locked state it prevents removal of a dewar vessel located within said cavity and, in an unlocked state, it allows for removal of said dewar vessel; wherein switching is between a locked and unlocked state, based on one or more of:
   a user-input element, such as a keypad or biometric sensor; and,
   signaling from a remote device.

10. A dewar vessel storage apparatus according to claim 9,
   in which the locking mechanism or locking mechanism controller is programmable with a lock profile, which defines at least one of; the time one or more of the locking mechanisms are set in a locked or unlocked state; the geographic location at which the locking mechanisms are set in a locked or unlocked state; the state of the locking mechanism(s) based on the presence or absence of a dewar vessel in any one of the other cavities to provide for control of the number of dewar vessels that may be removed at any one time; user authentication details, such as an access password or biometric information, required to switch any one or more of the locking mechanisms between the locked and unlocked states.

11. A dewar vessel storage apparatus according to claim 1, in which the apparatus includes a dilution gas element configured to provide a dilution gas with any gas expelled from the dewar vessels through the ventilation assembly.

12. A dewar vessel storage apparatus according to claim 1, in which the apparatus includes an evacuation element configured to provide for the controlled release of the contents of one or more of the dewar vessels within the apparatus, on receipt of an evacuation signal, wherein the evacuation signal is provided by one or more of:
   a tamper detection element;
   a temperature sensor;
   a remote device via a communication element.

13. A dewar vessel storage apparatus according to claim 1, in which the apparatus includes a communication element configured to provide communication with a remote device wherein the apparatus is configured to use the communication element to:
   provide signaling, to the remote device, indicative of consumption of gas or availability of gas, such as the quantity of gas contained within the dewar vessels and/or the number of dewar vessels that have been removed from the apparatus or used or that remain in the apparatus; and,
   wherein the communication element is configured to, based on at least one of a measure of the quantity of gas contained with the dewar vessels of the apparatus and a geolocation of the apparatus, provide signaling to one or more remote devices to indicate that one or more dewar vessels are available for providing to another user and the location of the apparatus.

14. A dewar vessel storage apparatus according to claim 1, in which the apparatus includes an electrochemical fuel cell configured to use at least gas vented from the one or more dewar vessels to generate electricity, the electrochemical fuel cell configured to provide said electricity to one or more of:
- a telemetry assembly configured to measure a property of the apparatus or a dewar vessel therein for sending to a remote device;
- a geolocation determination element configured to determine the location of the apparatus;
- a clock;
- a user-input element for receiving user input, such as to access the dewar vessels in the apparatus;
- a tamper detection element configured to determine if the apparatus is being or has been tampered with;
- a communication element configured to provide for communication between the apparatus and a remote device;
- a temperature sensor configured to monitor an internal or external temperature of apparatus; and a transaction element configured to provide for the logging of the removal of a dewar vessel as an energy transfer transaction.

15. A method of providing a liquefied or cryo-compressed gas or slush to a point of use comprising:
- providing a dewar vessel storage apparatus as defined in claim 1;
- providing a plurality of dewar vessels for receiving the liquefied or cryo-compressed gas or slush;
- transporting the dewar vessel storage apparatus having the plurality of dewar vessels stored therein to the point of use; and providing for individual removal of one of the plurality of dewar vessels at the point of use.

16. A method according to claim 15, in which the method includes filling the plurality of dewar vessels while stored within the dewar vessel storage apparatus 1; and,
in which the step of filling includes circulating gas through the dewer vessels.

* * * * *